United States Patent [19]

Gulczynski

[11] Patent Number: 5,155,430

[45] Date of Patent: * Oct. 13, 1992

[54] SWITCHING POWER SUPPLY WITH CONSTANT OR SINUSOIDAL INPUT CURRENT AND WITH FIXED OR VARIABLE OUTPUT VOLTAGE

[76] Inventor: Zdzislaw Gulczynski, P.O. Box 11633, Costa Mesa, Calif. 92627

[*] Notice: The portion of the term of this patent subsequent to Jun. 13, 2008 has been disclaimed.

[21] Appl. No.: 444,730

[22] Filed: Dec. 1, 1989

[51] Int. Cl.[5] .................. G05F 1/56; H02M 3/335
[52] U.S. Cl. ........................... 323/224; 323/266; 323/267; 323/271; 363/16; 363/48; 363/89
[58] Field of Search ............... 323/222, 224, 225, 266, 323/267, 268, 271; 363/16, 44–48, 89, 126

[56] References Cited

U.S. PATENT DOCUMENTS

| | | | |
|---|---|---|---|
| 4,502,104 | 2/1985 | Mitchell | 363/89 |
| 4,533,986 | 8/1985 | Jones | 323/222 |
| 4,692,851 | 9/1987 | Attwood | 363/16 |
| 4,729,081 | 3/1988 | Nilssen | 363/126 |
| 4,831,508 | 5/1989 | Hunter | 363/126 |

Primary Examiner—Peter S. Wong

[57] ABSTRACT

The switching power supply has high output power and high efficiency. The input voltage may be AC or DC. The input current may be constant or sinusoidal, output voltage fixed or variable. Smallest possible peak currents of switches result in best possible line and component utilizations at any time. In particular, inrush and surge currents are eliminated. A diode applies the input voltage to the output. A capacitor is coupled to the input for storing a base voltage. A switch selectively couples the capacitor to the output. A converter is used to convert the output voltage into the base voltage. The load is coupled to the output and further to the input or ground. A filter can be used to reduce output ripple voltage.

20 Claims, 2 Drawing Sheets

SWITCHING POWER SUPPLY WITH CONSTANT OR SINUSOIDAL INPUT CURRENT AND WITH FIXED OR VARIABLE OUTPUT VOLTAGE

CROSS REFERENCE TO RELATED INVENTIONS

This invention is related to the following inventions by the same inventor:

"Switching Power Apparatus Having High Power Factor and Comprising Pair of Converters for Obtaining Fixed or Variable Output Voltage" Ser. No. 665,950 filed Mar. 11, 1991;

"Ultra Efficient Resonant Switching Power Apparatus" Ser. No. 632,546 filed Dec. 24, 1990;

"Switching Power Apparatus with 3-State Driver" Ser. No. 517,853 filed May 2,1990;

"Bidirectional Switching Power Apparatus with AC or DC Output" U.S. Pat. No. 5,057,990 dated Oct. 15, 1991;

"Capacitive Load Driver with Binary Output" Ser. No. 474,488 filed Feb. 2, 1990;

"3-Terminal Bidirectional Switching Power Supply with AC or DC Input and AC or DC Output" Ser. No. 444,729 filed Dec. 1, 1989 herewith;

"Switching Power Supply with Constant or Sinusoidal Input Current" Ser. No. 393,391 filed Aug. 14, 1989;

"Switching Power Supply Comprising Pair of Converters for Obtaining Constant or Sinusoidal Input Current and Fixed or Variable Output Voltage" U.S. Pat. No. 4,999,568 dated Mar. 12, 1991;

"Ultra Efficient Switching Power Amplifier" U.S. Pat. No. 4,980,649 dated Dec. 25, 1990;

"Synchronous Switching Power Supply Comprising Buck Converter" Ser. No. 363,325 filed Jun 8, 1989;

"Synchronous Switching Power Supply Comprising Boost or Flyback Converter" Ser. No. 363,326 filed Jun 8, 1989;

"Synchronous Switching Power Supply with Boost and/or Flyback Converters" Ser. No. 363,327 filed Jun 8, 1989;

"High Power Switching Power Supply" U.S. Pat. No. 4,947,308 dated Aug. 7, 1990;

"High Efficiency Power Factor Correction Circuit" U.S. Pat. No. 4,949,234 dated Aug. 14, 1990;

"High Power Switching Power Supply with High Power Factor" Ser. No. 304,508 filed Jan 31, 1989;

"High Power Switching Power Supply Having High Power Factor" U.S. Pat. No. 4,956,760 dated Sept. 11, 1990;

"Power Switch Driver" U.S. Pat. No. 4,940,906 dated Jul. 10, 1990;

"Synchronous Switching Power Supply with Flyback Converter" U.S. Pat. No. 4,853,837 dated Aug. 1, 1989;

"High Efficiency Power Amplifier Comprising Multilevel Power Supply" U.S. Pat. No. 4,871,980 dated Oct. 3, 1989;

"Switching Power Amplifier" U.S. Pat. No. 4,763,080 dated Aug. 9, 1988;

"Switching Circuits Performing Thyristor and Triac Functions" U.S. Pat. No. 8,845,391 dated Jul. 4, 1989;

"Switching Power Supply" U.S. Pat. No. 4,803,610 dated Feb. 7, 1989;

"Switching Power Supply" U.S. Pat. No. 4,736,286 dated Apr. 5, 1988; and

"Push-Pull Power Amplifier" U.S. Pat. No. 4,476,441 dated Oct. 9, 1984.

BACKGROUND OF THE INVENTION

The invention relates to switching power supply (SPS) receiving AC or DC voltage, particularly for power supply systems requiring high output power and high efficiency. The SPS is capable of obtaining constant or sinusoidal input current and fixed or variable output voltage. Peak currents of switches are smallest possible as to accomplish best possible line and component utilizations. In particular, inrush and surge currents are eliminated.

Conventional SPSs are used to convert AC line voltage into DC voltage. The AC voltage is rectified. An input capacitor is charged which causes inrush current and surge currents every peak of the AC voltage. Pulse width modulation (PWM) is used which results in numerous problems including high circuit complexity, stability problems and significantly higher effective switching frequency. Numerous interference suppressors and protection circuits are inevitable. Power factor correction circuit is employed which further increases complexity and decreases efficiency.

Conventional power factor correction circuit employs a boost switching circuit. Rectified line voltage is applied thereto. Therefore, switching frequency or PWM varies in a large range. The circuit is practically inoperative near line voltage crossover. The voltage provided by the boost circuit is inherently greater than the peak of the line voltage. An output capacitor is coupled to ground, whereby the inrush current is inevitable.

Power factor defines performance of an SPS. It is a ratio of the SPS output power over input power. The input power is RMS input voltage multiplied by RMS input current. The power factor is often specified only for the correction circuit. In fact, the power factor depends on efficiency of the entire SPS. A conventional power factor correction circuit simulates sinusoidal input current which is in phase with the line voltage. Therefore, the SPS simulates a resistive load. However, switches of the power factor correction circuit must sustain peak currents at least 1.41 times higher than the RMS input current. The respective control circuit is complicated, wherein many compromises are inevitable.

SUMMARY OF THE INVENTION

The best possible input current waveform is constant current. This is also the natural choice since the SPS output current remains usually unchanged during half-wave periods of the line voltage. Moreover, the SPS output voltage or voltages have fixed values. It is therefore desirable to apply a stabilized voltage to a power transformer as to minimize an output ripple current.

The present invention is intended to provide an SPS having a high output power, high efficiency and fixed or variable output voltage. The input voltage may be AC or DC. The high efficiency is achieved by activating a minimum number of switches. Peak currents of the switches are smallest possible as to accomplish best possible line and component utilizations at any time. Preferably, the input current is constant. However, the sinusoidal input current, pure or with DC current superimposed thereon, can be also obtained.

Considering limitations of real world, an ideal SPS should exhibit in particular:

a constant (not sinusoidal and not square-wave) input current within half-waves of line voltage, even with varying output current;
no inrush current;
no surge currents;
continuous, uninterrupted input current;
one bulk capacitor for storing the energy, also used during power failure;
an intermediate stabilized voltage;
universal line voltage and thus the intermediate stabilized voltage independent of peak of the line voltage;
possibility of obtaining the intermediate stabilized voltage having a high value as to reduce current ratings;
very small output ripple current as a result of the intermediate stabilized voltage;
a diode for applying rectified line voltage directly to the load as to increase the efficiency;
no minimum load;
one pair of switches for obtaining the constant input current and intermediate stabilized voltage;
another pair of switches for accomplishing push-pull driving of power transformer and for coupling the intermediate stabilized voltage thereto;
average currents conducted by rectifiers and switches slightly higher than SPS output current divided by transformer turns ratio;
switching at zero current;
limited turn-on times of the switches;
possibility of shutting the switches off for any period of time;
possibility of switching only three switches;
at least two switches connected to ground; and
no voltage spikes, no transient voltage suppressors, no snubbers, etc.

The SPS according to the present invention meets all these requirements.

Moreover, the SPS has the capability of providing a varying output voltage. Therefore, the SPS is perfectly suitable to operate with high performance switching power amplifiers as disclosed in the aforementioned "Ultra Efficient Switching Power Amplifier" U.S. Pat. No. 4,980,649 dated Dec. 25, 1990 and "Switching Power Amplifier" U.S. Pat. No. 4,763,080 dated 08/09/88, by the same inventor. SPS according to the present invention converts input voltage applied to input into output voltage appearing at output and comprises: a diode means for applying the input voltage to the output; a capacitive means coupled to the input for storing a base voltage; a switching means for selectively coupling the capacitive means to the output; and a converter means for converting the output voltage into the base voltage.

In another embodiment the SPS further includes: an inductive means coupled in series with the output for attaining a current; and a second capacitive means for providing a second output voltage in response to the current and input voltage.

There are three basic configurations for converting a predetermined DC input voltage into desired DC output voltage. Assuming positive input voltage, three components of these converters are connected to the input, ground and output respectively:
boost converter—inductor, switch and cathode of diode;
buck converter—switch, anode of diode and inductor; and
flyback converter—switch, inductor and anode of diode.

The SPS according to the present invention is a combination of the boost, buck and flyback converters. Moreover, the SPS is operative even when the input voltage is zero, whereby the constant input current can be obtained. The output voltage provided by the SPS is filtered, wherein the inrush current is eliminated. A rectifier is employed for applying the DC input voltage to the output. This reduces switching, particularly during a peak of the input voltage, and thus increases the efficiency of the converter.

Power factor does not reflect the best possible arrangement. The power factor equal 1 represents resistive load having a fixed value. However, line peak currents are $\sqrt{2}$ or 1.41 times higher than the RMS value. In contrast, a constant input current within each half-wave of the line voltage results in smallest possible peak currents and thus best possible line and component utilizations. Consequently, the load represents a nonlinear resistor having sinusoidal rather than fixed resistance. Peak currents are merely $\pi\sqrt{2}/4$ or 1.11 times higher than the RMS value. Moreover, from the view point of a control circuitry, it is significantly easier to determine a fixed rather than sinusoidal input current. The impedance of the line cord and line, ESR of filter capacitors, dynamic impedance of rectifiers and impedance of EMI filter have significantly reduced effect. Phase shift and problems relating to distortions of line waveform do not exist.

BRIEF DESCRIPTION OF THE DRAWINGS

The present invention will become more clear in conjunction with the accompanying figures of which.

DETAILED DESCRIPTION OF THE INVENTION

Figure 1:
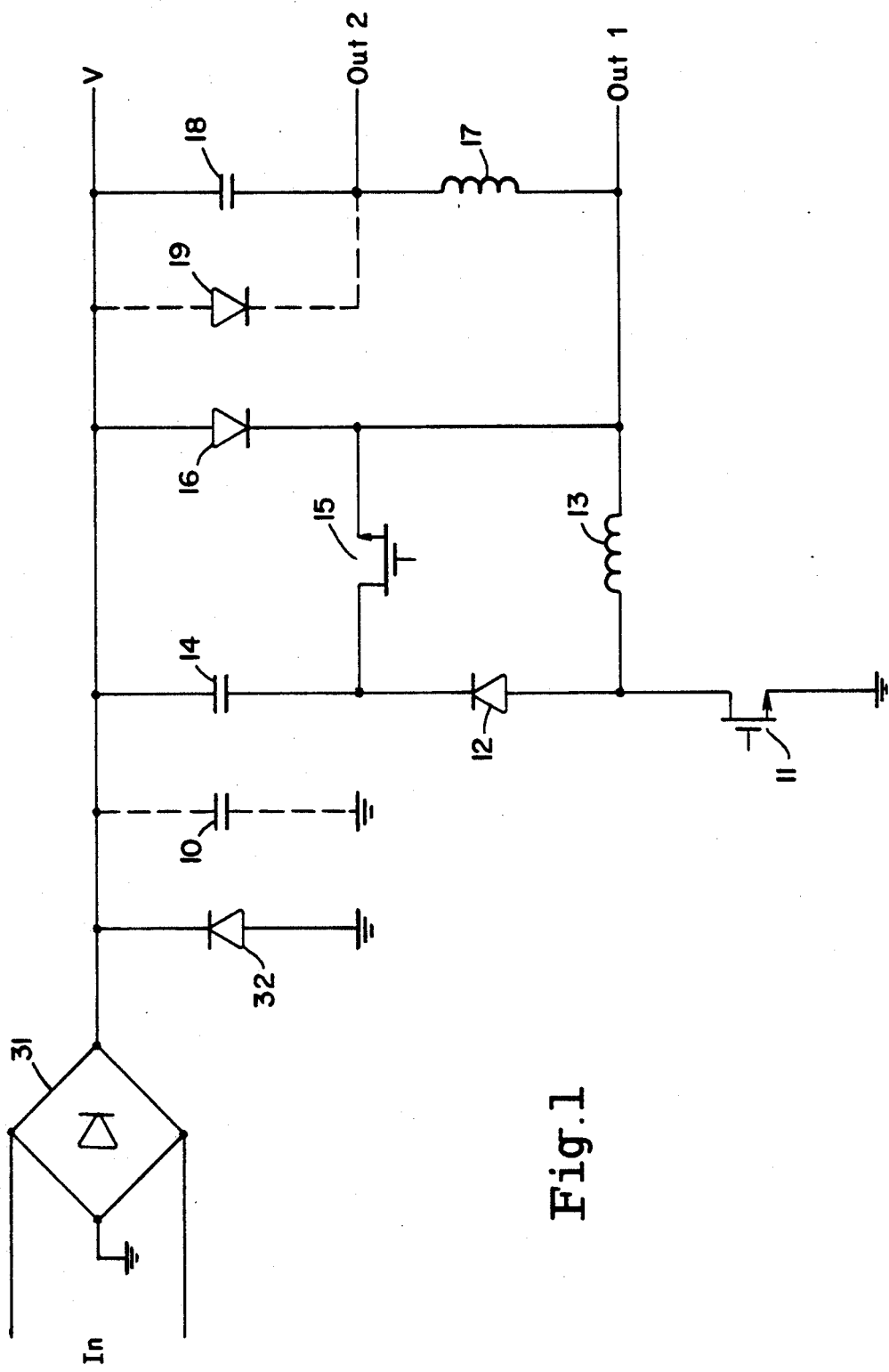
FIG. 1 is the preferred embodiment of the SPS with optional output filter.

FIG. 1 is the preferred embodiment of the SPS with optional output filter. The input voltage is AC, e.g. line voltage. Obviously, the SPS also employs an input line filter, not shown for simplicity. The diode bridge 31 is coupled in series with line for obtaining a positive rectified voltage, referred to as V. In particular, V is pulsating and has minimum value substantially equal zero. The SPS converts V into a first and possibly second output voltages appearing at Out1 and Out2 respectively. The diode 16 applies V to Out1. The capacitor 14 is coupled to V for storing a base voltage. The capacitor 14 has a large value to provide the energy during power failure. The n-channel MOSFET 15 selectively couples the capacitor 14 to Out1, whereby the base voltage appears at Out1 when V is equal zero. A converter is used to convert the SPS output voltage appearing at Out1 into the base voltage. Specifically, the inductor 13 is coupled to Out1 for attaining a current. The n-channel MOSFET 11 selectively couples the inductor 13 to ground. The diode 12 applies the inductor current to the capacitor 14.

When V is above a threshold, the transistor 11 is switched and transistor 15 is open. When the transistor 11 is closed, V is applied across the inductor 13. The diodes 12 and 16 are reverse and forward biased respectively. When the transistor 11 is open, the diode 12 conducts the inductor current and the base voltage across the capacitor 14 is increased. The base voltage is positive with reference to V. The SPS output voltage appearing at Out1 is equal V. The diode 16 conducts the inductor current as well as load current.

When V is below the threshold, the transistors 11 and 15 may be opened and closed respectively. The diodes 12 and 16 are reverse biased and V increased by the base voltage is applied to Out1. The capacitor 14 is discharged thru the load, wherein the SPS input current is equal to the load current. The SPS input current can be increased by switching the transistors 11 and 15. Specifically, the transistors 11 and 15 are turned on until the inductor current reaches the desired value. When the transistor 11 turns off, the transistor 15 also turns off as to use the energy stored in the inductor 13 for charging the capacitor 14. The transistor 15 can be turned on when the transistor 11 is off and inductor current is zero, i.e. after charging the capacitor 14.

The SPS input current intends to be equal 1.11 times the load current as to attain the constant input current and thus best possible performance. The transistor 15, if closed, conducts the SPS input current. Otherwise, the current flows thru the diode 16. The SPS input current is a sum of the drain current of the transistor 11 and load current. Thereby, the SPS input current can be increased by switching the transistor 11. For instance, if load current is fixed, the transistor 11 and diode 12 conduct merely 11% of the load current. Moreover, the SPS input current remains constant within half-wave of the line voltage even if the load current varies in range from zero to 1.11 times the load current immediately after zero crossing of line voltage. The SPS input current can be also increased after any increase of the load current and then remain constant.

In another embodiment, the output filter is employed. The SPS output voltage appearing at Out1 is equal V or V increased by the base voltage when the transistor 15 is opened or closed respectively. For instance, if the base and threshold voltages are set to half the peak value of V, the minimum SPS output voltage may be also equal half the peak value of V. By adding the output filter, the SPS provides a stabilized output voltage at Out2. The filter consists of the inductor 17 and capacitor 18. The inductor 17 is coupled in series with Out1 and further to Out2 for attaining a current.

The capacitor 18 provides the second output voltage appearing at Out2 and in response to V and the current of the inductor 17. Specifically, the capacitor 18 is coupled between V and Out2. The current of the inductor 17 is determined in response to V and load current so that the capacitor 18 is charged and discharged to compensate for varying value of V. The value of the capacitor 18 is significantly smaller than of capacitor 14. The optional diode 19 is coupled between V and Out2 for limiting the voltage across the capacitor 18. However, when the transistor 15 is open for a long period of time, the inductor 17 acts as short circuit and diode 16 operates like diode 19.

The preferred value of the stabilized SPS output voltage at Out2 is near the peak value of V. This results in increased efficiency of the SPS. When V is near the peak value, the transistor 15 is shut off. The load current flows thru the diode 16, inductor 17 and possibly diode 19. For instance, this condition can be maintained 30% or 50% of the time when V is greater than 90% or 70% of its peak value respectively. The transistor 15 is switched then 70% or 50% of the time respectively.

The transistor 11 is switched to increase the SPS input current, whereby constant value thereof is maintained.

The capacitor 18 is charged when the transistor 15 is closed and the current of the inductor 17 is greater than the load current. The transistor 11 can be also closed to increase the SPS input current. The capacitor 18 is discharged thru the load and when the transistors 11 and 15 are closed and opened respectively, whereby no minimum load in necessary. The voltage across the capacitor 18 may vary from zero to the peak value of V. The capacitor 18 filters the SPS output voltage as to reduce high frequency voltage ripple. The value of the capacitor 18 also affects low frequency voltage ripple in a full range of load currents. The transistor 15, if closed, conducts currents of the inductors 13 and 17. Otherwise, the currents flow thru the diode 16. The diode 19 is forward biased only when the capacitor 18 is completely discharged.

The SPS output voltage at Out2 can be greater than peak value of V. The transistors 11 and 15 can operate in the manner disclosed hereinabove. In particular, the capacitor 18 is charged when the transistor 15 is closed and the current of the inductor 17 is greater than load current. Otherwise, the capacitor 18 is discharged. The maximum voltage across the capacitor 18 is near the base voltage. The inductors 13 and 17 are coupled in series and conduct the same current when the transistor 15 is open and diode 16 is reverse biased. The diode 19 is superfluous.

Power failure protection is accomplished by means of the diode 32 which is coupled between V and ground. The diode 32 conducts when line fails. In particular, when the transistor 15 is closed, the voltage appearing at Out1 is equal to the base voltage. The SPS maintains the output voltage at Out2, wherein the capacitor 14 delivers the energy. Generally, the SPS operates as if V has reached minimum value, i.e. zero, since diode 32 conducts when V is substantially equal zero. The diode 32 may also conduct during zero crossings of the line voltage.

The optional capacitor 10 is coupled between the diode bridge 31 and ground, i.e. in parallel with the diode 32. The capacitor 10 reduces input current spikes which occur if the SPS output current is interrupted. Otherwise, the SPS input current is uninterrupted since the load of the transistors 11 and 15 is inductive. In particular, a portion of the SPS input current flows either thru the capacitor 14 or diode 16, and remains uninterrupted when the transistors 11 and 15 switch. The capacitor 10 has relatively small value so that the rectified line voltage is crudely filtered.

The second output voltage may be also changed in a wide range independently of momentary value of V. In particular, the voltage at Out2 can vary from the peak value of V to the base voltage minus the peak value of V. The voltage across the capacitor 18 compensates for varying value of V. Moreover, the load can be coupled to V and further to Out1 or Out2. The SPS input current is then equal to the drain current of the transistor 11. An average value of the current may be constant or purely sinusoidal. In particular, the load can be coupled across the capacitor 18 whose voltage can vary from zero to the base voltage. In any case, the capacitor 18 is charged thru the transistor 15 and discharged thru the transistor 11 and load.

Figure 2:
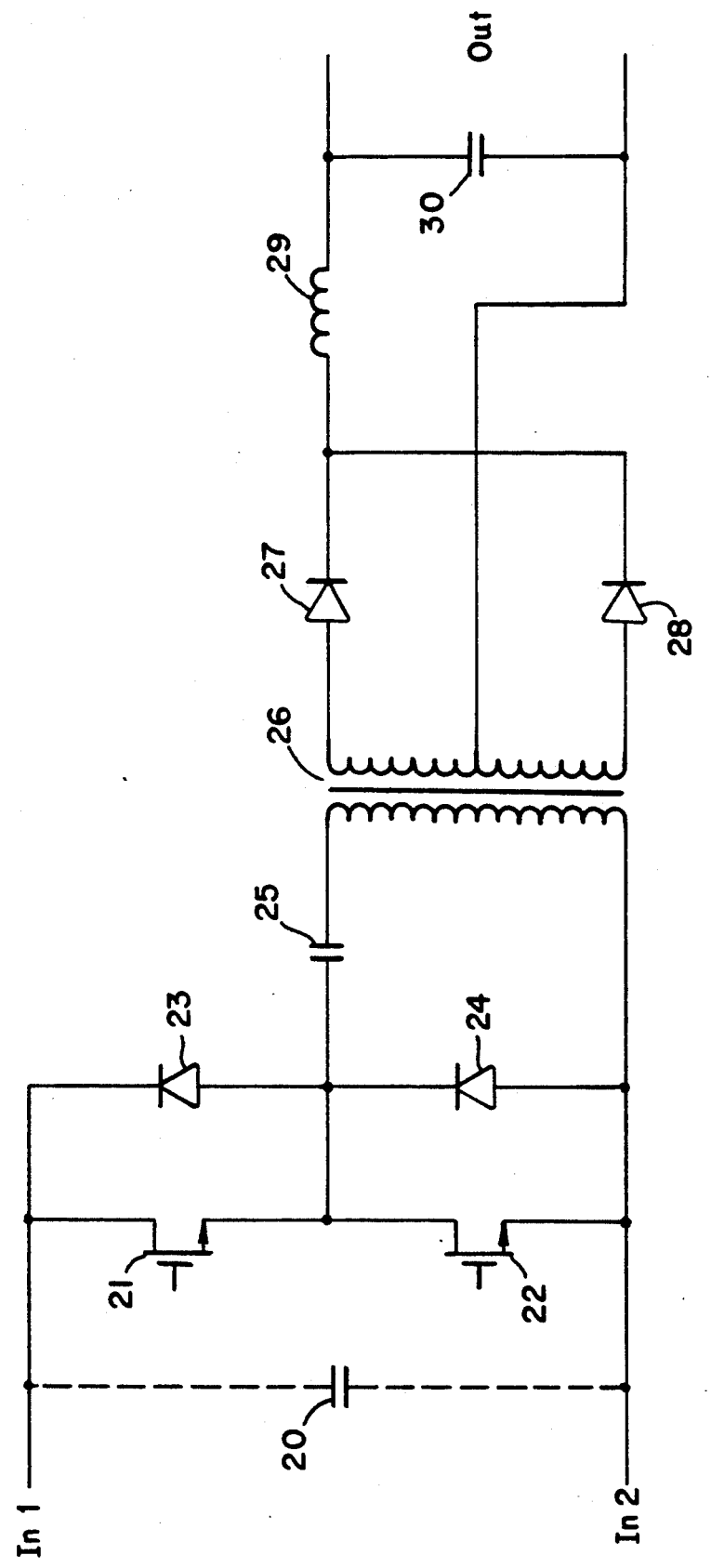
FIG. 2 is an embodiment of output stage with transformer and push-pull driver therefor.

FIG. 2 is an embodiment of output stage with transformer and push-pull driver therefor. The output stage has a pair of inputs which are coupled to outputs of the FIG. 1 embodiment. Therefore, the output stage represents a second converter for converting the output voltage of the FIG. 1 embodiment into a second output voltage. The embodiments of FIGS. 1 and 2 are coupled in series and constitute an SPS which has line isolation and converts the line voltage into AC and DC output voltages. The components 17 thru 19 shown in FIG. 1 are considered a portion of the output stage. Specifically, the inductor 17 is coupled in series with Out1 for attaining a current. The capacitor 18 provides a third output voltage in response to the current and V. The diode 19 is optional.

The output stage includes an inductive means for providing an AC output signal. A switching means selectively couples the inductive means to In1 and In2 and includes a pair of switches which are coupled in series therebetween. Each switch consists of a transistor and diode coupled in parallel therewith to prevent voltage spikes and reverse currents in the transistor. Specifically, the n-channel MOSFET 21 and diode 23 are coupled to In1, and the n-channel MOSFET 22 and diode 24 are coupled to In2. The transformer 26 represents the inductive means. The capacitor 25 is coupled in series with primary of the transformer 26 for preventing a DC current therein and correcting flux symmetry. The capacitor 20 is coupled between In1 and In2 for storing the voltage applied thereacross. The capacitor 20 can be replaced with a pair of series coupled capacitors, wherein the primary is coupled thereto. The capacitor 25 is then optional.

In1 is connected to Out1 or Out2 while In2 is connected to ground. In1 and In2 can be also connected to Out2 and V respectively. The capacitor 18 is unnecessary if the capacitor 20 is used. When the transistor 21 is on, the transistor 22 is off. The voltage between In1 and In2 reduced by the voltage stored in the capacitor 25 is applied across the primary of the transformer 26. Subsequently, the transistors 21 and 22 are turned off and on respectively. The voltage stored in the capacitor 25 is applied across the primary. Therefore, the transistors 21 and 22 are switched so that voltages having substantially equal magnitudes and opposite polarities are successively applied across the primary of the transformer 26.

The transistors 21 and 22 can be turned on for a fixed period and remain off for any period of time. These periods are preferably equal while the SPS provides a maximum output current, i.e. under full load condition. A minimum switching frequency is limited by determining a maximum pulse width. A control circuit can employ comparators as to avoid an analog feedback. The current flowing thru the primary can be also monitored by means of comparators as to determine short circuit current of the SPS. Another comparator can be employed to compare an average input current of the SPS against a fixed reference voltage.

The secondary of the transformer 26 is electromagnetically coupled to the primary and provides an AC output voltage. The diodes 27 and 28 have anodes coupled to the secondary for rectifying the AC output voltage and providing an output current. The inductor 29 is coupled to cathodes of the diodes 27 and 28 for limiting the output current and reducing output ripple voltage. The capacitor 30 is coupled to the inductor 29 and a center-tap of the secondary for storing the DC output voltage of the SPS.

The embodiments of the present invention described herein are intended to be taken in an illustrative and not a limiting sense. Various modifications and changes may be made to these embodiments by persons skilled in the art without departing from the scope of the present invention as defined in the appended claims.

I claim:

1. Switching power supply converting input voltage applied to an input into output voltage appearing at an output, comprising:
    a diode means for applying the input voltage to the output;
    a capacitive means coupled to the input for storing a base voltage;
    a switching means for selectively coupling the capacitive means to the output; and
    a converter means for converting the output voltage into the base voltage.

2. Switching power supply of claim 1 wherein the converter means includes:
    an inductive means coupled to the output for attaining a current;
    a second switching means for selectively coupling the inductive means to ground; and
    a rectifying means for applying the current to the capacitive means.

3. Switching power supply of claim 1 further including a rectifying means coupled to the input for rectifying an AC input signal.

4. Switching power supply of claim 1 further including a rectifying means coupled to the input for conducting a current when the input voltage is substantially equal zero.

5. Switching power supply of claim 1 further including an input capacitive means coupled to the input for reducing input current spikes.

6. Switching power supply of claim 1 further including:
    an inductive means coupled in series with the output for attaining a current; and
    a second capacitive means for providing an additional output voltage in response to the current and input voltage.

7. Switching power supply of claim 6 further including a rectifying means for limiting a voltage across the second capacitive means.

8. Switching power supply of claim 1 further including a second converter means for converting said output voltage into a second output voltage.

9. Switching power supply of claim 8 wherein the second converter means includes:
    an inductive means coupled in series with the output for attaining a current; and
    a second capacitive means for providing an additional output voltage in response to the current and input voltage.

10. Switching power supply of claim 8 wherein the second converter means includes a second capacitive means for storing said output voltage.

11. Switching power supply of claim 8 wherein the second converter means includes an inductive means for providing the second output voltage.

12. Switching power supply of claim 11 wherein the second converter means includes a second switching means for selectively coupling the inductive means to the output and further to the input.

13. Switching power supply of claim 12 wherein the second switching means includes a pair of switches coupled in series.

14. Switching power supply of claim 13 wherein each switch includes a transistor and diode coupled in parallel therewith.

15. Switching power supply of claim 11 further including a second capacitive means coupled in series with the inductive means for preventing a DC current therein.

16. Switching power supply of claim 11 wherein the inductive means includes a pair of electromagnetically coupled inductors; and further including a rectifying means coupled to one inductor for rectifying a signal appearing thereat and providing the second output voltage.

17. Switching power supply of claim 16 further including an output capacitive means for storing the second output voltage.

18. Switching power supply of claim 11 wherein the second converter means includes a second switching means for selectively coupling the inductive means to the output and further to ground.

19. Switching power supply of claim 18 wherein the second switching means includes a pair of switches coupled in series.

20. Switching power supply of claim 19 wherein each switch includes a transistor and diode coupled in parallel therewith.

* * * * *